United States Patent
Okuzono (10) Patent No.: US 8,631,263 B2
(45) Date of Patent: Jan. 14, 2014

(54) INFORMATION PROCESSING APPARATUS, CONTROL METHOD FOR INFORMATION PROCESSING APPARATUS, AND COMPUTER-READABLE STORAGE MEDIUM

(75) Inventor: Ryotaro Okuzono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 12/824,022

(22) Filed: Jun. 25, 2010

(65) Prior Publication Data

US 2010/0332885 A1    Dec. 30, 2010

(30) Foreign Application Priority Data

Jun. 30, 2009    (JP) ................................. 2009-155313

(51) Int. Cl.
*G06F 1/00*    (2006.01)
(52) U.S. Cl.
USPC ........................................................ 713/324
(58) Field of Classification Search
USPC ......................................... 713/320, 323, 324
See application file for complete search history.

(56) References Cited

U.S. PATENT DOCUMENTS

| | | | |
|---|---|---|---|
| 5,481,733 A * | 1/1996 | Douglis et al. ................ | 713/324 |
| 5,493,670 A * | 2/1996 | Douglis et al. ................ | 713/324 |
| 6,266,776 B1 * | 7/2001 | Sakai ............................. | 713/300 |
| 2005/0117462 A1 * | 6/2005 | Kano et al. .................. | 369/30.27 |
| 2007/0073970 A1 * | 3/2007 | Yamazaki et al. ............ | 711/114 |
| 2008/0109663 A1 * | 5/2008 | Snyder et al. ................. | 713/300 |
| 2009/0067083 A1 * | 3/2009 | Ikenoue et al. ................ | 360/75 |
| 2009/0276650 A1 * | 11/2009 | Kuroda et al. ................ | 713/320 |
| 2010/0082729 A1 * | 4/2010 | Shitomi ........................ | 709/202 |

FOREIGN PATENT DOCUMENTS

JP    2008-140492    6/2008

OTHER PUBLICATIONS

HGST, Ramp Load/Unload Technology in Hard Disk Drives, Nov. 2007.*

* cited by examiner

*Primary Examiner* — Kim Huynh
*Assistant Examiner* — Austin Hicks
(74) *Attorney, Agent, or Firm* — Canon USA Inc. IP Division (57) ABSTRACT

An information processing apparatus decreases power supply to a processing unit if a predetermined condition is satisfied. If a waiting time has elapsed during a power saving state in which power supply to the processing unit is decreased, the information processing apparatus cancels the power saving state. The information processing apparatus executes a head retraction in response to the cancellation of the power saving state. The information processing apparatus stops power supply to the storage unit in response to completion of the head retraction.

8 Claims, 6 Drawing Sheets

INFORMATION PROCESSING APPARATUS, CONTROL METHOD FOR INFORMATION PROCESSING APPARATUS, AND COMPUTER-READABLE STORAGE MEDIUM

BACKGROUND OF THE INVENTION

1. Field of the Invention

The present invention relates to an information processing apparatus, a control method for the information processing apparatus, and a computer-readable storage medium.

2. Description of the Related Art

Some hard disk drives (HDDs) are configured to record the number of times of power-on/off that represents how many times the HDD was turned on/off.

The number of times of power-on/off of the HDD is used in various control operations, so that it is required to be accurately recorded.

Japanese Patent Application Laid-open No. 2008-140492 discusses a method for setting a waiting time to be waited before the HDD is turned off based on a cumulative value of energizing time of the HDD and a cumulative value of the number of times of power-on/off of the HDD. In the method discussed in Japanese Patent Application Laid-open No. 2008-140492, in a case where a time period measured by a timer comes to exceed a set waiting time, the HDD is turned off.

On the other hand, the HDD causes a head to be retracted to a location other than a storage area of the disk when the HDD stops the disk from rotating.

This retraction of the head can prevent the storage area of the disk from being damaged by the head when the HDD is suffered from an impact while the rotation of the disk is stopped.

Main examples of a head retraction system include a load/unload system and a contact start stop (CSS) system.

In the load/unload system, the head is retracted to an outside of the storage area of the disk. In the load/unload system, the number of times of power-on/off is recorded at a time when the HDD is turned off.

In the CSS system, the head is retracted to an inside of the storage area of the disk. In the CSS system, the number of times of power-on/off is recorded at a time when the head is retracted.

Recently, in an information processing apparatus, in view of power saving, such a configuration is studied that a central processing unit (CPU) is turned off at a time when a job is completed and thereafter, the HDD is turned off after a predetermined waiting time has elapsed.

However, in the above described configuration, the number of times of power-on/off may not be accurately recorded in the following case.

Figure 6:
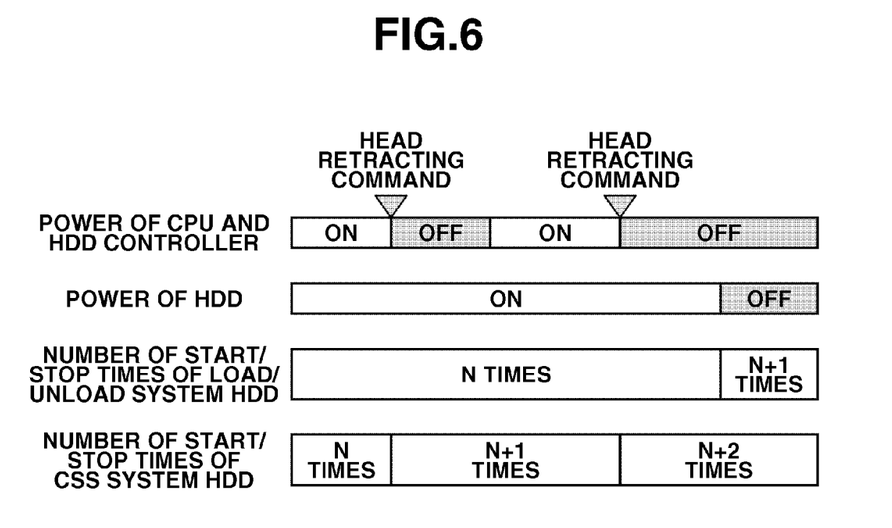
FIG. 6 is a time chart illustrating control of a power mode of an MFP according to the conventional art.

FIG. 6 illustrates a case where the CPU is turned on again (because of an input of a job or the like) after once it is turned off in the above described configuration.

In FIG. 6, in the case of HDDs of the load/unload system, since the number of times of power-on/off is recorded at a time when the HDD is turned off, the number of times of power-on/off is accurately recorded.

However, in the case of HDDs of the CSS system, since the number of times of power-on/off is recorded at a time when the head is retracted, the number of times of power-on/off may not be accurately recorded.

It is difficult to know which system is employed in retracting the head based on an appearance of the HDD or information recorded in the HDD.

Therefore, the information processing apparatus is required to be designed in such a manner that the number of times of power-on/off is accurately recorded regardless of which system is used in the HDD.

SUMMARY OF THE INVENTION

The present invention is directed to an information processing apparatus capable of appropriately storing the number of times of power-on/off of a storage unit.

According to an aspect of the present invention, an information processing apparatus includes a processing unit configured to process data, a storage unit configured to store the data processed by the processing unit in a disk by using a head, a supplying unit configured to supply electric power to the processing unit and the storage unit, a control unit configured to control power supply to the processing unit and the storage unit, and a setting unit configured to set awaiting time for waiting until stopping power supply to the storage unit, wherein the control unit controls the supplying unit to decrease power supply to the processing unit if a predetermined condition is satisfied, and, if the waiting time set by the setting unit has elapsed during a power saving state in which power supply to the processing unit is decreased, to cancel the power saving state, wherein the processing unit controls the storage unit to retract the head to a retraction area in response to the power saving state being canceled by the supplying unit, and wherein the control unit controls the supplying unit to stop power supply to the storage unit in response to completion of retraction of the head by the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
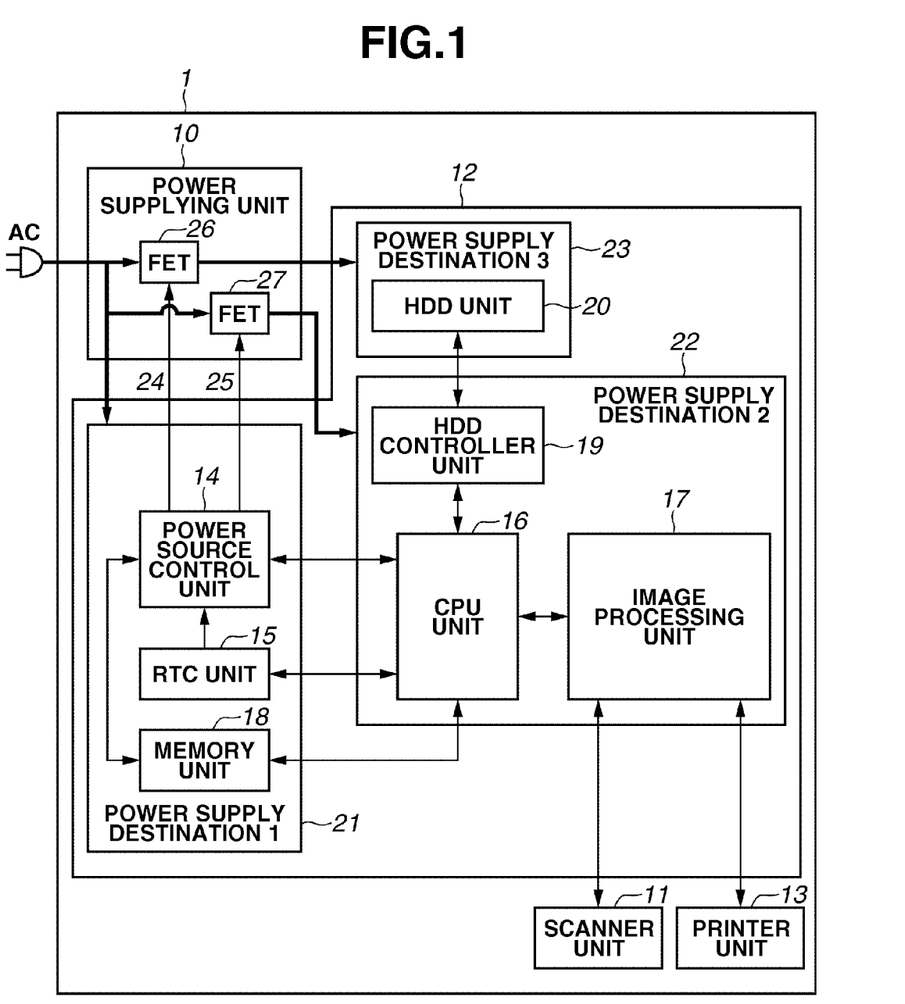
FIG. 1 is a block diagram illustrating a configuration of a multifunction peripheral (MFP) according to a first exemplary embodiment of the present invention.

FIG. 1 is a block diagram illustrating a configuration of an MFP 1 (an image processing apparatus having multiple functions including a copying function, a printing function, a scanning function, and the like) according to a first exemplary embodiment of the present invention.

A power supplying unit 10 supplies electrical power to each of units of the MFP 1.

A scanner unit 11 reads a document to generate image data thereof.

A controller unit 12 controls each unit of the MFP 1.

A printer unit 13 forms an image on a sheet by, for example, an electrophotographic method based on the input image data.

A power source control unit 14 controls turning on/off of the power of each unit when the apparatus is shifted to a power saving mode, and detects occurrence of a factor, such as input of a job, based on which the apparatus returns from the power saving mode, to thereby control supply of power to each unit.

A real-time clock (RTC) unit 15 controls time of the controller unit 12 and issues an external interrupt to a central processing unit (CPU) 16 after a set time has elapsed. The RTC unit 15 also has a function to, when the time set during the power saving mode has elapsed, notify the power source control unit 14 as the occurrence of a factor for causing the apparatus to return from the power saving mode.

The CPU unit 16 controls the MFP system in its entirety.

An image processing unit 17 compresses data from the scanner unit 11 and outputs image data processed by the CPU unit 16 to the printer unit 13.

A memory unit 18, which is a volatile memory such as a Double-Data-Rate Synchronous Dynamic Random Access Memory (DDR SDRAM), functions as a work area for the CPU unit 16.

An HDD controller unit 19 transmits data or issues a command to an HDD unit 20 based on an instruction from the CPU unit 16.

Figure 5:
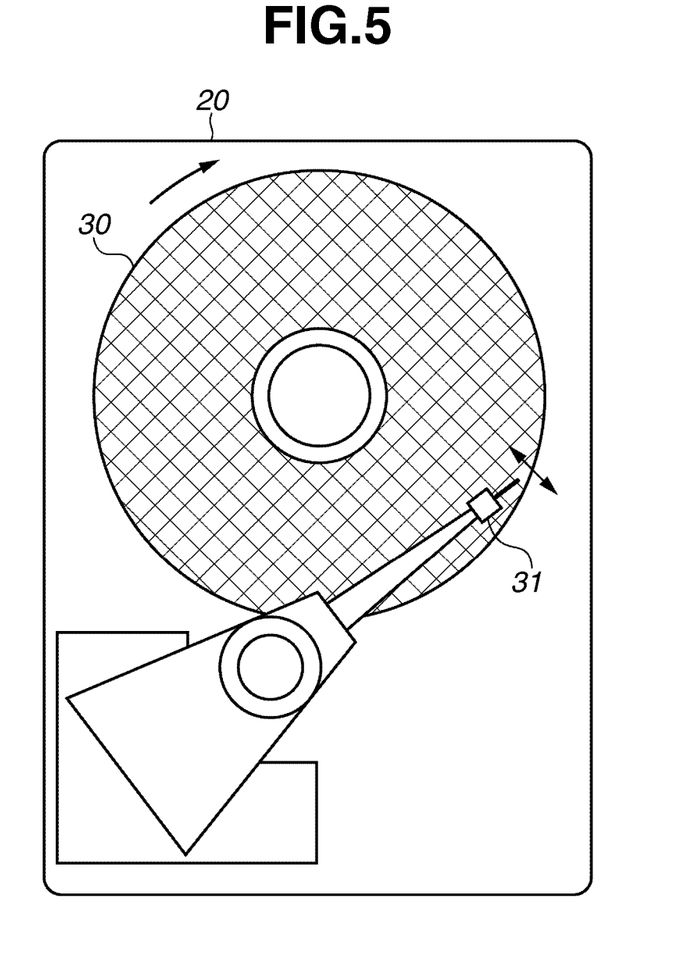
FIG. 5 illustrates a configuration of an HDD unit according to the first exemplary embodiment.

The HDD unit 20, which is a hard disk drive (HDD) as an external storage device, stores various types of data. FIG. 5 illustrates a configuration of the HDD unit 20. In the HDD unit 20, a disk 30 rotates and a head 31 scans the disk 30, thereby achieving an access to (reading or writing) the data stored in the disk 30. Further, in the HDD unit 20, when the power is turned off, the head 31 is retracted to a head retraction area (an area outside the storage area of the disk 30, which is hatched in FIG. 5). The number of times of power-on/off of the HDD unit 20 (which is counted such that one time power-on and one time power-off are counted as one power-on/off time) is stored in a portion of the storage area of the disk 30.

A group 21, which is a power supply destination 1, includes the power source control unit 14, the RTC unit 15, and the memory unit 18. To realize a management of the power of the entire MFP and returning of the apparatus from the power saving mode, the power would not be blocked in any of the power saving modes in the group 21.

A group 22, which is a power supply destination 2, includes the CPU unit 16, the image processing unit 17, and the HDD controller unit 19. Control of blocking/supplying the power to the group 22 is realized by controlling an FET switch 27 via a control signal 25 output from the power source control unit 14.

A group 23, which is a power supply destination 3, includes the HDD unit 20. Control of blocking/supplying the power to the group 23 is realized by controlling an FET switch 26 via a control signal 24 output from the power source control unit 14.

Figure 2:
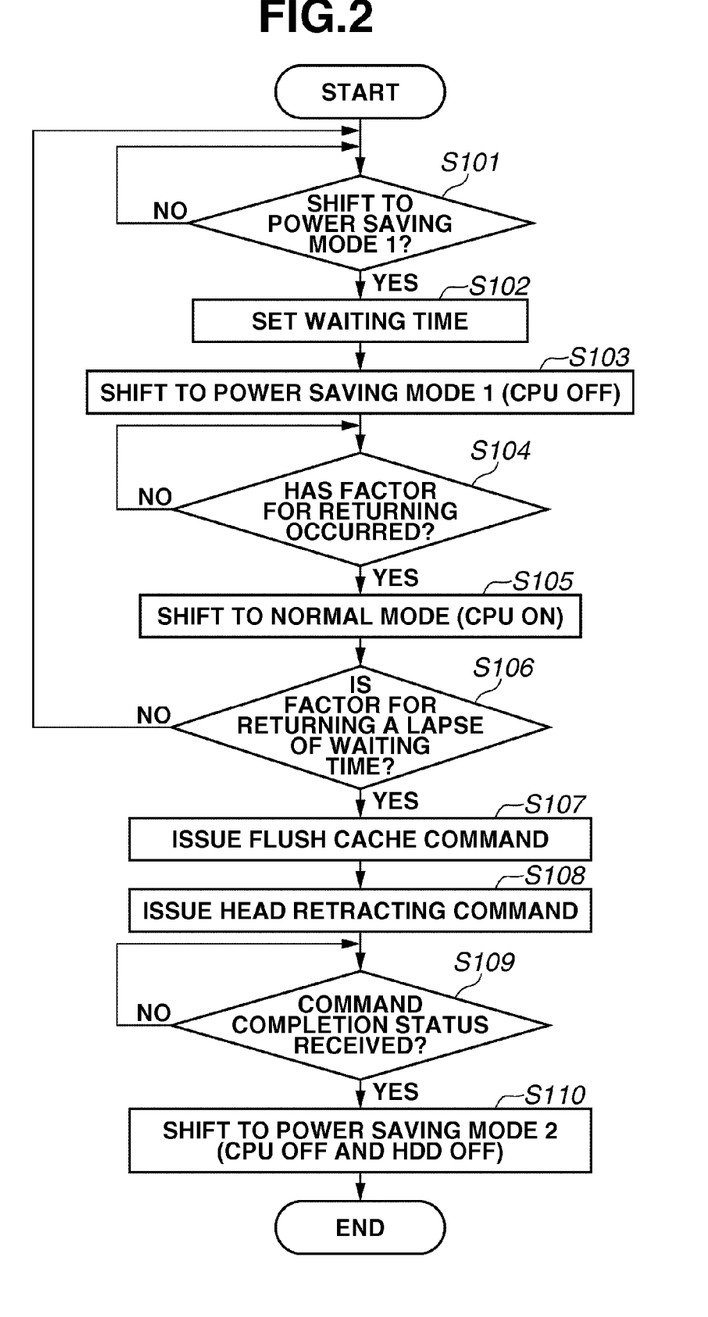
FIG. 2 is a flow chart illustrating control of a power mode of the MFP according to the first exemplary embodiment.

FIG. 2 is a flow chart illustrating control of the power mode of the MFP 1 according to the first exemplary embodiment. Operations illustrated in the flow chart of FIG. 2 are performed by operations of the CPU unit 16 and the power source control unit 14.

In the present exemplary embodiment, what is meant by the power of the apparatus being turned on is that the power supply to the apparatus is started, and what is meant by the power of the apparatus being turned off is that the power supply to the apparatus is stopped.

In the present exemplary embodiment, there are three modes (i.e., a normal mode, a power saving mode 1, and a power saving mode 2) as the power modes of the MFP 1. In the normal mode, electric power is supplied to the power supply destination 1 (the group 21), the power supply destination 2 (the group 22), and the power supply destination 3 (the group 23). In other words, in the normal mode, electric power is supplied to the CPU unit 16 and the HDD unit 20. In the power saving mode 1 (i.e., an HDD ON power saving mode), electric power is supplied to the power supply destination 1 (the group 21) and the power supply destination 3 (the group 23), but electric power is not supplied to the power supply destination 2 (the group 22). More specifically, in the power saving mode 1, electric power is not supplied to the CPU unit 16, but electric power is supplied to the HDD unit 20. In the power saving mode 2 (i.e., an HDD OFF power saving mode), electric power is supplied to the power supply destination 1 (the group 21), but electric power is not supplied to the power supply destination 2 (the group 22) or the power supply destination 3 (the group 23). In other words, in the power saving mode 2, electric power is not supplied to the CPU unit 16 or the HDD unit 20.

The present flow chart is started when the power of the MFP 1 is turned on. Upon starting, the MFP 1 is started with the normal mode.

In step S101, the CPU unit 16 determines whether a condition of the apparatus for shifting to the power saving mode 1 (a predetermined condition: in a case where no job is input into the MFP 1 for a predetermined time) is satisfied. In the present exemplary embodiment, the job is an inclusive name of a scanning job performed by the scanner unit 11, a printing job performed by the printer unit 13, and the like. Further, in the present exemplary embodiment, the input of the job means that data or an order is input to execute the job by an operation unit or an external input/output unit, which is not illustrated, of the MFP 1.

If the condition of the apparatus for shifting to the power saving mode is satisfied in step S101 (YES in step S101), then in step S102, the CPU unit 16 sets a waiting time for waiting until shifting to the power saving mode 2 after shifting to the power saving mode 1 to the RTC unit 15. The waiting time is a time equivalent to a value calculated by dividing a product lifetime which is secured with respect to the MFP 1 by the number of times of power-on/off which is secured with respect to the HDD unit 20 (this time is referred to as the "guarantee time"). In the present exemplary embodiment, the waiting time is not set again in step S102 in a case where the waiting time has already been set. However, the waiting time may be set again in step S102 even in a case where the waiting time has already been set. Instead of making the waiting time equivalent to the guarantee time, the waiting time may be calculated in such a manner that a time until the power of the CPU unit 16 is turned off after the power of the HDD unit 20 is turned on is subtracted from the guarantee time. Further, the waiting time may be measured in such a manner that a measurement is started when the power of the HDD unit 20 is turned on instead of starting the measurement when the power of the CPU unit 16 is turned off.

The RTC unit 15 starts measuring time when the waiting time is set and, when the waiting time has elapsed, notifies the lapse of the waiting time to the power source control unit 14.

In step S103, the power source control unit 14 stops or decreases the power supply to the power supply destination 2, including the CPU unit 16, via a control signal 25. Accordingly, the MFP 1 is shifted from the normal mode to the power saving mode 1 (shifted to the power saving state).

In step S104, the power source control unit 14 determines whether a factor, which causes the apparatus to return from the power saving mode 1 to the normal mode, has occurred. The factor for returning also includes a notification from the RTC unit 15 indicating that the waiting time has elapsed in addition to a general factor for returning (e.g., input of a job or an operation). In a case where the power source control unit 14 receives a notification from the RTC unit 15 indicating that the waiting time has elapsed as the factor for returning, the power source control unit 14 stores information indicative of the notification in the memory unit 18.

If the factor which causes the apparatus to return to the normal mode from the power saving mode 1 has occurred in step S104 (YES in step S104), then in step S105, the power source control unit 14 starts or increases, i.e., resumes, the power supply to the power supply destination 2, including the CPU unit 16. Accordingly, the MFP 1 is shifted to the normal mode from the power saving mode 1 (i.e., the power saving state is cancelled).

In step S106, the CPU unit 16 determines whether the factor for returning having occurred in step S104 is a notification from the RTC unit 15 indicating that the waiting time has elapsed. In step S106, the CPU unit 16 accesses the memory unit 18 to confirm if information indicative of reception of the notification from the RTC unit 15 indicating that the waiting time has elapsed is stored. In step S106, if the factor for returning is determined as the notification from the RTC unit 15 indicating that the waiting time has elapsed (YES in step S106), the processing proceeds to step S107. In step S106, if the factor for returning is determined as not the notification from the RTC unit 15 indicating that the waiting time has elapsed (NO in step S106), the processing returns to step S101.

If the factor for returning is determined as the notification from the RTC unit 15 indicating that the waiting time has elapsed in step S106 (YES in step S106), then in step S107, the CPU unit 16 issues a Flush Cache command and transmits the Flush Cache command to the HDD unit 20.

When the HDD unit 20 receives the Flush Cache command from the CPU unit 16, the HDD unit 20 transmits cache data thereof in the memory unit 18.

In step S108, the CPU unit 16 issues a head retracting command and transmits the head retracting command to the HDD unit 20.

When the HDD unit 20 receives the head retracting command from the CPU unit 16, the HDD unit 20 retracts the head. In a case where the head of the HDD is retracted by the CSS system, the HDD unit 20 records the number of times of power-on/off of the HDD (update: add one time) when the HDD unit 20 retracts the head. When the head is retracted, the HDD unit 20 transmits a command completion status to the CPU unit 16 after the head retraction is completed.

In step S109, the CPU unit 16 waits for the command completion status to be received from the HDD unit 20.

When the command completion status is received from the HDD unit 20 (YES in step S109), then in step S110, the power source control unit 14 stops or decreases the power supply to the power supply destination 2, including the CPU unit 16, and the power supply destination 3, including the HDD unit 20, via the control signals 24 and 25, respectively. Accordingly, the MFP 1 is shifted to the power saving mode 2 from the normal mode (i.e., the MFP 1 is shifted to the power saving state).

In a case where the load/unload system is employed for the head retracting system of the HDD, the HDD unit 20 records the number of times of power-on/off of the HDD (update: add one time) when the power supply is stopped.

In a case where a factor for returning from the power saving mode 2 to the normal mode has occurred after step S110, the MFP 1 is shifted from the power saving mode 2 to the normal mode to execute the processing from step S101.

The CPU unit 16 can read out the number of times of power-on/off of the HDD, recorded as described above, from the HDD unit 20 and use it as required.

Figure 3:
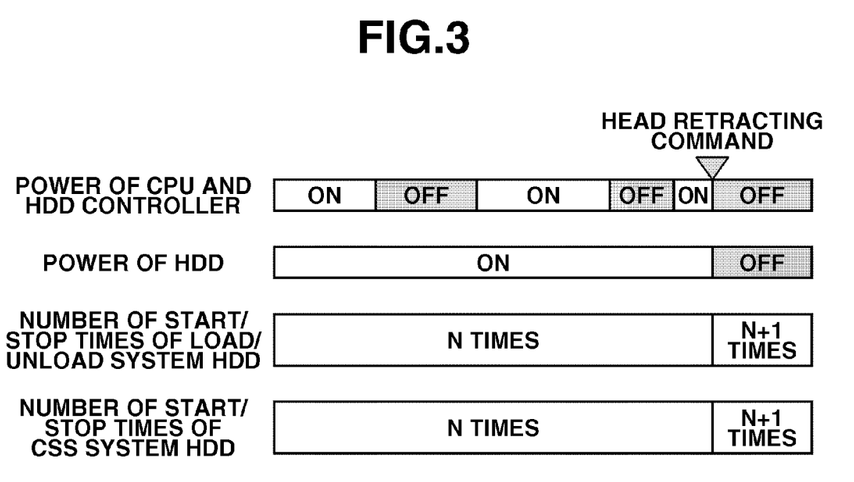
FIG. 3 is a time chart illustrating control of the power mode of the MFP according to the first exemplary embodiment.

FIG. 3 is a timing chart illustrating control of the power mode according to the first exemplary embodiment.

Referring to FIG. 3, when the power of the HDD is brought into an off state, the power of the CPU, which has been in an off state, is once turned on, thereby retracting the head.

Accordingly, both of the HDDs of the CSS type and the load/unload type have the same count values in counting the number of times of power-on/off, and thus an accurate counting of the number of times of power-on/off can be achieved.

According to the present exemplary embodiment, when the HDD is turned off in the information processing apparatus, the CPU, which has been in an off state, is turned on again to have the head retracted. Accordingly, the number of times of power-on/off of the HDD can be accurately recorded.

In the first exemplary embodiment, control illustrated in the flow chart of FIG. 2 is executed irrespective of the head retracting system of the HDD.

Alternatively, in a second exemplary embodiment of the present invention, control of the power mode of the MFP 1 is switched according to the head retracting system of the HDD, namely, according to either one of the load/unload system or the CSS system.

The determination of the system of retracting the head of the HDD can be enabled by causing the memory unit 18 to store a table in which a model number of the HDD is associated with the load/unload system or the CSS system. The determination of the system of retracting the head of the HDD may also be enabled by previously storing information indicative of the load/unload system or the CSS system in the HDD.

Since a configuration of the MFP 1 according to the second exemplary embodiment is similar to the configuration of the MFP 1 of the first exemplary embodiment as illustrated in FIG. 1, a description thereof is not repeated here.

Figure 4:
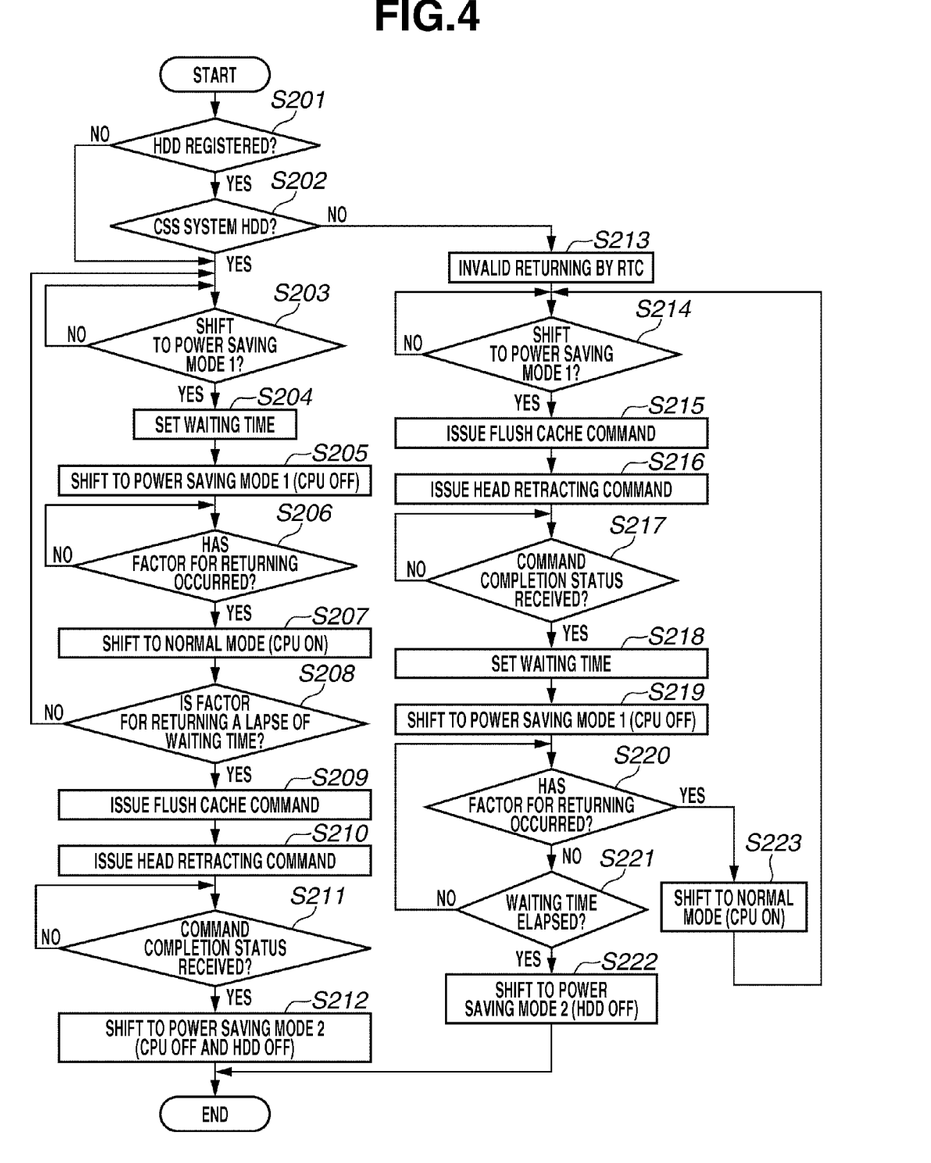
FIG. 4 is a flow chart illustrating control of a power mode of an MFP according to a second exemplary embodiment of the present invention.

FIG. 4 is a flowchart illustrating control of a power mode of the MFP 1 according to the second exemplary embodiment.

The present flow chart is started when the MFP 1 is turned on. At a time when the MFP 1 is turned on, the MFP 1 starts with the normal mode.

In step S201, the CPU unit 16 acquires a model number of the HDD unit 20 from the HDD unit 20 and determines whether the acquired model number is registered in the table stored in the memory unit 18. When it is determined that the model number of the HDD unit 20 is registered in the memory unit 18 in step S201 (YES in step S201), the processing proceeds to step S202. When it is determined that the model number of the HDD unit 20 is not registered in the memory unit 18 in step S201 (NO in step S201), the processing proceeds to step S203.

In step S202, the CPU unit 16 specifies the model number corresponding to thus acquired model number from among the model numbers registered in the table stored in the memory unit 18 and determines whether the head retracting system of the HDD unit 20 is the CSS system or the load/unload system. In step S202, in a case where the head retracting system is determined as the CSS system (YES in step S202), the processing proceeds to step S203. In a case where the head retracting system of the HDD unit 20 is determined as the load/unload system (NO in step S202), the processing proceeds to step S213.

Steps S203 through S212 are similar to steps S101 through S110, respectively.

In step S213, the CPU unit 16 invalidates returning by the RTC unit 15. More specifically, the CPU unit 16 limits a factor for returning, which is received in step S220, to a general factor for returning (e.g., input of a job or an operation), and receives a notification indicating that the waiting time has elapsed from the RTC unit 15 in step S221.

Step 214 is similar to step S101.

Steps S215 through S217 are similar to steps S107 through S109, respectively.

Steps S218 and S219 are similar to steps S102 and S103, respectively.

In step S220, the power source control unit 14 determines whether the factor for returning from the power saving mode 1 to the normal mode has occurred. The factor for returning is a general factor for returning (i.e., input of a job or an operation). In step S220, if the factor for returning from the power saving mode 1 to the normal mode has occurred (YES in step S220), the processing proceeds to step S223. In step S220, if the factor for returning from the power saving mode 1 to the normal mode has not occurred (NO in step S220), the processing proceeds to step S221.

In step S221, the power source control unit 14 determines whether a notification indicating that the waiting time has elapsed is received from the RTC unit 15. In step S221, if it is determined a notification indicating that the waiting time has elapsed is received from the RTC unit 15 (YES in step S221), the processing proceeds to step S222. In step S221, if it is determined no notification indicating that the waiting time has elapsed is received from the RTC unit 15 (NO in step S221), the processing proceeds to step S220.

Step S222 is similar to step S110.

Step S223 is similar to step S207.

According to the present exemplary embodiment, in the case of the CSS system, the power of the CPU is turned on again when the power of the HDD is turned off, and in the case of the load/unload system, the power of the CPU is not turned on again when the power of the HDD is turned off. Therefore, appropriate power control can be achieved according to the head retracting system of the HDD. Further, power consumption in the CPU can be decreased in comparison with the power consumption in the CPU of the first exemplary embodiment.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155313 filed Jun. 30, 2009, which is hereby incorporated by reference herein in its entirety.

What is claimed is:

1. An information processing apparatus, which is connectable to a first kind of storage unit or a second kind of storage unit, the number of times of power-on/off of the first kind of storage unit being recorded at a time when a head of the storage unit is retracted, the number of times of power-on/off of the second kind of storage unit being recorded at a time when the second kind of storage unit is turned off, comprising:

a processing unit;

a storage unit, wherein the information processing apparatus has a plurality of power modes which includes a first power mode, a second power mode, and a third power mode, wherein the processing unit and the storage unit are in a power-on state in the first power mode, the processing unit is in a power-off state and the storage unit is in the power-on state in the second power mode, and the processing unit and the storage unit are in the power-off state in the third power mode; and a determination unit configured to determine the kind of the storage unit connected to the information processing apparatus, wherein, in a case that the determination unit determines that the storage unit is the first kind of storage unit, the processing unit does not issue a head retracting command to the storage unit when the information processing apparatus shifts to the second power mode, and issues the head retracting command to the storage unit when the information processing apparatus shifts to the third power mode, and the information processing apparatus shifts to the third power mode via the first power mode when a condition for shifting to the third power mode is satisfied in the second power mode, and wherein, in a case that the determination unit determines that storage unit is the second kind of storage unit, the processing unit issues the head retracting command to the storage unit when the information processing apparatus shifts to the second power mode, and does not issues the head retracting command to the storage unit when the information processing apparatus shifts to the third power mode, and the information processing apparatus shifts to the third power mode not via the first power mode when a condition for shifting to the third power mode is satisfied in the second power mode.

2. The information processing apparatus according to claim 1, wherein the determination unit determines the kind of the storage unit based on a model number of the storage unit.

3. The information processing apparatus according to claim 1, wherein the processing unit issues the head retracting command to the storage unit, after the information processing apparatus shifts to the first power mode, in a case where the determination unit fails to determine the kind of the storage unit.

4. The information processing apparatus according to claim 1, wherein the first kind of storage unit is a CSS system.

5. The information processing apparatus according to claim 1, wherein the second kind of storage unit is a Load/Unload system.

6. The information processing apparatus according to claim 1, wherein in a case where a condition for shifting to the second power mode is satisfied when the information processing apparatus is in the first power mode, the information processing apparatus shifts to the second power mode.

7. The information processing apparatus according to claim 6, wherein the condition for shifting to the second power mode includes no job being input to the information processing apparatus in the first power mode for a predetermined time.

8. The information processing apparatus according to claim 1, wherein the condition for shifting to the third power mode includes no access to the storage unit in the second power mode for a predetermined time.

* * * * *